US012275514B1

(12) United States Patent
Maxeiner et al.

(10) Patent No.: US 12,275,514 B1
(45) Date of Patent: Apr. 15, 2025

(54) ELECTRICALLY CONTROLLABLE PITCH PROPELLER SYSTEM FOR MARITIME CRAFTS

(71) Applicant: Rolls-Royce Marine North America Inc., Walpole, MA (US)

(72) Inventors: Eric Maxeiner, Walpole, MA (US); Eric Davis, Walpole, MA (US); Donald Ricciuti, Walpole, MA (US); Anthony Youst, Walpole, MA (US); Michael Schwartz, Walpole, MA (US)

(73) Assignee: Rolls-Royce Marine North America Inc., Walpole, MA (US)

( * ) Notice: Subject to any disclaimer, the term of this patent is extended or adjusted under 35 U.S.C. 154(b) by 21 days.

(21) Appl. No.: 18/371,618

(22) Filed: Sep. 22, 2023

(51) Int. Cl.
| | |
|---|---|
| *B63H 3/08* | (2006.01) |
| *B63H 3/06* | (2006.01) |
| *B64C 11/44* | (2006.01) |
| *F16H 3/66* | (2006.01) |
| *B63H 3/00* | (2006.01) |
| *B63H 23/08* | (2006.01) |

(52) U.S. Cl.
CPC .............. *B63H 3/081* (2013.01); *B63H 3/06* (2013.01); *B64C 11/44* (2013.01); *F16H 3/666* (2013.01); *B63H 2003/004* (2013.01); *B63H 2003/006* (2013.01); *B63H 23/08* (2013.01)

(58) Field of Classification Search
CPC .......... B63H 3/06; B63H 3/081; B63H 23/08; B63H 2003/004; B63H 2003/006; B64C 11/44; F16H 3/666
See application file for complete search history.

(56) References Cited

U.S. PATENT DOCUMENTS

| | | | |
|---|---|---|---|
| 1,181,458 A | 5/1916 | Iskols | |
| 1,877,048 A | 9/1932 | Popp | |
| 2,392,556 A | 1/1946 | Eduard | |
| 2,441,838 A | 5/1948 | Heinrich | |
| 2,548,045 A * | 4/1951 | Nichols | B63H 3/06 |
| | | | 416/165 |
| 2,629,451 A | 2/1953 | Nichols | |
| 2,675,084 A | 4/1954 | Nichols | |
| 3,043,374 A | 7/1962 | Letourneau | |
| 3,406,759 A | 10/1968 | Ata | |
| 4,648,345 A | 3/1987 | Wham et al. | |
| 4,936,746 A | 6/1990 | Mayo et al. | |
| 5,423,726 A * | 6/1995 | Kota | B60K 17/346 |
| | | | 475/221 |
| 5,498,135 A * | 3/1996 | Stallard, III | B63H 3/02 |
| | | | 416/61 |

(Continued)

FOREIGN PATENT DOCUMENTS

| | | |
|---|---|---|
| DE | 3008414 A1 | 9/1981 |
| DE | 4446621 A1 | 6/1996 |

(Continued)

*Primary Examiner* — Michael K. Reitz
(74) *Attorney, Agent, or Firm* — Barnes & Thornburg LLP

(57) ABSTRACT

An electrically actuated propeller pitch control system includes a propeller hub assembly, a propeller assembly, and a crosshead drive system. The propeller hub assembly rotates about the central axis during operation of watercraft. The propeller assembly is configured to selectively rotate a propeller blade. The crosshead drive system includes an electric motor, a transmission, and a lead screw that rotates about the central axis.

20 Claims, 8 Drawing Sheets

(56) References Cited

U.S. PATENT DOCUMENTS

| | | |
|---|---|---|
| 5,931,637 A | 8/1999 | Wheeler |
| 5,934,609 A | 8/1999 | Kuklinski |
| 5,967,749 A | 10/1999 | Eaves et al. |
| 6,425,788 B1 | 7/2002 | Lindholm |
| 6,544,000 B1 | 4/2003 | Jessup et al. |
| 8,162,611 B2 | 4/2012 | Perkinson et al. |
| 8,777,575 B2 * | 7/2014 | Forsstrom ............... B63H 3/04 |
| | | 416/165 |
| 9,611,020 B2 | 4/2017 | Ulgen |
| 10,870,481 B2 * | 12/2020 | De Wergifosse ......... F02C 6/20 |
| 11,225,318 B1 | 1/2022 | Seeley |
| 2005/0106955 A1 | 5/2005 | Atmur |
| 2007/0134092 A1 | 6/2007 | Rosenkranz et al. |
| 2012/0094555 A1 | 4/2012 | Calverley et al. |
| 2013/0142653 A1 | 6/2013 | Krackhardt et al. |
| 2015/0274271 A1 | 10/2015 | Brautaset |
| 2015/0321740 A1 | 11/2015 | Bradley et al. |
| 2016/0290490 A1 * | 10/2016 | Brassitos ................ F16H 57/08 |
| 2021/0016864 A1 | 1/2021 | McBain |
| 2021/0114706 A1 | 4/2021 | Marquis et al. |

FOREIGN PATENT DOCUMENTS

| | | |
|---|---|---|
| GB | 149755 A | 8/1920 |
| GB | 165132 A | 6/1921 |
| GB | 569056 A | 5/1945 |
| GB | 572952 A | 10/1945 |
| GB | 694190 A | 11/1947 |
| GB | 694193 A | 11/1947 |
| GB | 608964 A | 9/1948 |
| GB | 855435 A | 11/1960 |
| GB | 1265150 A | 3/1972 |
| GB | 1415357 A | 11/1975 |
| WO | 2010044734 A1 | 4/2010 |
| WO | 2020119945 A1 | 6/2020 |

* cited by examiner

ELECTRICALLY CONTROLLABLE PITCH PROPELLER SYSTEM FOR MARITIME CRAFTS

FIELD OF THE DISCLOSURE

The present disclosure relates generally to propellers, and more specifically to electric controllable pitch propellers for maritime crafts.

BACKGROUND

Propellers are used to provide a driving force to move watercraft such as ships. Propellers typically include propeller blades coupled to a hub that rotates the propeller blades around an axis to provide the driving force to move the ship through the water.

Some propeller blades are fixed to the hub at a given pitch angle. In other examples, it may be advantageous to be able to control the propeller blades such that the pitch angle may be adjusted. In such systems, a pitch controller allows the speed of the ship to change by varying the angle or pitch of the propeller blades. The pitch controller further allows the operator to change the direction of movement of the ship by turning the propeller blades from ahead direction to astern direction. As a result, the propeller drives the ship in a reverse direction and may also be used to stop forward motion of the ship. There remains interest in improving propeller pitch controllers.

SUMMARY

The present disclosure may comprise one or more of the following features and combinations thereof.

An electrically actuated propeller pitch control system for use with watercraft may comprise a propeller hub assembly, a propeller assembly, and a crosshead drive system. The propeller hub assembly may include a hub cone, a hub body, and a spigot. The hub cone may extend circumferentially about a central axis. The hub cone may have a forward end, an aft end opposite the forward end, and an outer wall. The outer wall may extend between the forward end and the aft end about the central axis to define a cavity. The hub body may be coupled with the forward end of the hub cone and arranged circumferentially about the central axis to define an interior space therein. The spigot may be coupled to the hub body. The hub body may be configured to transfer rotational energy from a propulsion shaft to the propeller hub assembly to cause the propeller hub assembly to rotate about the central axis during operation of the watercraft. The hub body may be formed to include a plurality of blade-receiving holes extending therethrough circumferentially spaced apart from one another and opening into the interior space.

In some embodiments, the propeller assembly may be configured to selectively rotate a propeller blade to vary a pitch angle of the propeller blade during operation of the watercraft. The propeller assembly may include a crosshead and variable pitch blade assembly. The crosshead may be located in the interior space of the hub body axially forward of the spigot. The variable pitch blade assembly may be coupled with the hub body. The variable pitch blade assembly may extend through a respective one of the plurality of blade-receiving holes of the hub body and into engagement with the crosshead. The crosshead may be formed to include a threaded hole extending axially therethrough. The crosshead may be arranged to move selectively axially along the central axis to cause the propeller blade to rotate.

In some embodiments, the crosshead drive system may include an electric motor, a transmission, and a lead screw. The electric motor may be located in the cavity of the hub cone. The transmission may include a reduction gearset coupled with the electric motor and located in the cavity of the hub cone. The lead screw may extend through and may be mated with the threaded hole formed in the crosshead. The lead screw may be coupled with the reduction gearset. The electric motor may be configured to drive rotation of the reduction gearset and the lead screw about the central axis to cause the crosshead to move axially within the interior space of the hub body and drive rotation of the propeller blade about a blade axis extending through the propeller blade to vary the pitch angle of the propeller blade.

In some embodiments, the reduction gearset may include a first planetary gearset and a second planetary gearset. The first planetary gearset may include a first ring gear having a first diameter, a first sun gear, and a plurality of first planet gears. The second planetary gearset may include a second ring gear having a second diameter, a second sun gear, and a plurality of second planet gears. The second diameter of the second ring gear may be greater than the first diameter of the first ring gear.

In some embodiments, the reduction gearset may include a third planetary gearset. The third planetary gearset may include a third ring gear having a third diameter, a third sun gear, and a plurality of third planet gears. The third diameter of the third ring gear may be greater than the second diameter of the second ring gear.

In some embodiments, the first planetary gearset may be arranged axially between the electric motor and the second planetary gearset. The second planetary gearset may be arranged axially between the first planetary gearset and the third planetary gearset. The third planetary gearset may be arranged axially between the second planetary gearset and the crosshead.

In some embodiments, the first planetary gearset may be coupled directly with the electric motor. The second planetary gearset may be coupled directly with the lead screw. The spigot may be formed to include a first axial passage extending therethrough along the central axis. The reduction gearset may be formed to include a second axial passage extending therethrough along the central axis. The lead screw may be formed to include a third axial passage extending therethrough along the central axis. The first axial passage of the spigot, the second axial passage of the reduction gearset, and the third axial passage of the lead screw may be aligned with one another to define a continuous passageway that extends axially through the propeller pitch control system.

In some embodiments, the crosshead drive system may include a lubrication conduit and an electrical conduit. The lubrication conduit may extend through the continuous passageway to direct lubrication therethrough toward the reduction gearset and the lead screw. The electrical conduit may extend through the continuous passageway and may be connected with the electric motor to supply power to the electric motor.

In some embodiments, the crosshead drive system may include a pitch position indicator system configured to detect the pitch angle of the propeller blade. The pitch position indicator system may include a crosshead follower and a position rod. The crosshead follower may extend through the propeller hub assembly and may be coupled for axial movement with the crosshead. The position rod may be coupled with the crosshead follower and may extend away from the propeller hub assembly and through the propulsion shaft. The position rod may be arranged to move axially along the central axis within the propulsion shaft in response to the crosshead moving axially along the central axis.

In some embodiments, the spigot may include a flange and a cylindrical member. The flange may extend circumferentially about the central axis. The cylindrical member may extend axially aft away from the flange and into the interior space of the hub body. The hub body may include an outer band and a forward wall. The outer band may extend circumferentially about the central axis. The forward wall may extend radially inwardly from the outer band toward the central axis. The forward wall may define an opening into the interior space of the hub body. The flange may engage the forward wall such that the outer band of the hub body extends circumferentially around the flange and the flange closes the opening into the interior space of the hub body.

In some embodiments, the hub body may include an outer band and an aft wall. The outer band may extend circumferentially about the central axis. The aft wall may extend radially inwardly from the outer band toward the central axis. The reduction gearset may include a forward end and an aft end opposite the forward end. The aft end of the reduction gearset may extend into and be supported by the electric motor. The forward end of the reduction gearset may extend into the lead screw. A ratio of a major diameter of the threads of the lead screw to a diameter of the hub body may be about 1 to about 2.5.

In some embodiments, the variable pitch blade assembly may include a crank ring, the propeller blade, and a cam follower. The crank ring may be configured to be received by a corresponding one of the plurality of blade-receiving holes to rotate within the corresponding one of the plurality of blade-receiving holes about the blade axis. The propeller blade may be fixed to and extending radially outwardly from the crank ring. The cam follower may engage the crosshead. The crosshead may include a body and a plurality of cams. The body may extend circumferentially about the central axis. The plurality of cams may extend radially outwardly away from the body and may be circumferentially spaced apart from one another. Each of the plurality of cams may define a slot that extends perpendicular to the central axis. The cam follower of the variable pitch blade assembly may be received in a corresponding slot of one of the plurality of cams.

According to another aspect of the present disclosure, an electrically actuated propeller pitch control system for use with watercraft may comprise a propeller hub assembly, a propeller assembly, and a crosshead drive system. The propeller hub assembly may include a hub cone, a hub body, and a spigot. The hub cone may extend circumferentially about a central axis and may have a forward end and an aft end opposite the forward end. The hub body may be coupled with the forward end of the hub cone and may be arranged circumferentially about the central axis. The spigot may be coupled to the hub body. The hub body may be configured to transfer rotational energy to the propeller hub assembly to cause the propeller hub assembly to rotate about the central axis during operation of the watercraft.

In some embodiments, the propeller assembly may be configured to selectively rotate a propeller blade. The propeller assembly may include a crosshead and a variable pitch blade assembly. The crosshead may be located within the hub body. The variable pitch blade assembly may engage the crosshead. The crosshead may be formed to include a hole extending axially therethrough.

In some embodiments, the crosshead drive system may include an electric motor, a transmission, and a lead screw. The electric motor may be located within the hub cone. The transmission may be coupled with the electric motor. The lead screw may extend through the hole formed in the crosshead. The lead screw may be coupled with the transmission. The electric motor may be configured to drive rotation of the transmission and the lead screw about the central axis to cause the crosshead to move selectively axially along the central axis and drive rotation of the propeller blade to vary a pitch angle of the propeller blade.

In some embodiments, the transmission may include a first planetary gearset and a second planetary gearset. The first planetary gearset may be coupled with the electric motor. The second planetary gearset may be coupled between the first planetary gearset and the crosshead. The first planetary gearset may include a first ring gear having a first diameter, a first sun gear, and a plurality of first planet gears. The second planetary gearset may include a second ring gear having a second diameter, a second sun gear, and a plurality of second planet gears. The second diameter of the second ring gear may be greater than the first diameter of the first ring gear.

In some embodiments, the transmission may include a third planetary gearset. The third planetary gearset may include a third ring gear having a third diameter, a third sun gear, and a plurality of third planet gears. The third diameter of the third ring gear may be greater than the second diameter of the second ring gear.

In some embodiments, the first planetary gearset may be arranged axially between the electric motor and the second planetary gearset. The second planetary gearset may be arranged axially between the first planetary gearset and the third planetary gearset. The third planetary gearset may be arranged axially between the second planetary gearset and the crosshead.

In some embodiments, the spigot may be formed to include a first axial passage extending therethrough along the central axis. The transmission may be formed to include a second axial passage extending therethrough along the central axis. The lead screw may be formed to include a third axial passage extending therethrough along the central axis. The first axial passage of the spigot, the second axial passage of the transmission, and the third axial passage of the lead screw may be aligned with one another to define a continuous passageway that extends axially through the propeller pitch control system.

A method may comprise supplying power to an electric motor arranged within a hub cone of a propeller hub assembly. The method may include driving a reduction gearset arranged within the hub cone with the electric motor. The method may include rotating a lead screw coupled with the reduction gearset about a central axis with the reduction gearset. The method may include axially translating a crosshead arranged within a hub body of the propeller hub assembly in response to rotation of the lead screw. The lead screw may extend axially through the crosshead.

In some embodiments, the method may include rotating a propeller blade about a blade axis extending through the propeller blade in response to axial translation of the crosshead to alter a pitch angle of the propeller blade. The reduction gearset may include a first planetary gearset, a second planetary gearset, and a third planetary gearset. The first planetary gearset may include a first ring gear having a first diameter, a first sun gear, and a plurality of first planet gears. The second planetary gearset may include a second ring gear having a second diameter, a second sun gear, and a plurality of second planet gears. The third planetary gearset may include a third ring gear having a third diameter, a third sun gear, and a plurality of third planet gears. The second diameter of the second ring gear may be greater than the first diameter of the first ring gear. The third diameter of the third ring gear may be greater than the second diameter of the second ring gear.

In some embodiments, the first planetary gearset may be arranged axially between the electric motor and the second planetary gearset. The second planetary gearset may be arranged axially between the first planetary gearset and the third planetary gearset. The third planetary gearset may be arranged axially between the second planetary gearset and the crosshead.

These and other features of the present disclosure will become more apparent from the following description of the illustrative embodiments.

DETAILED DESCRIPTION

Figure 1:
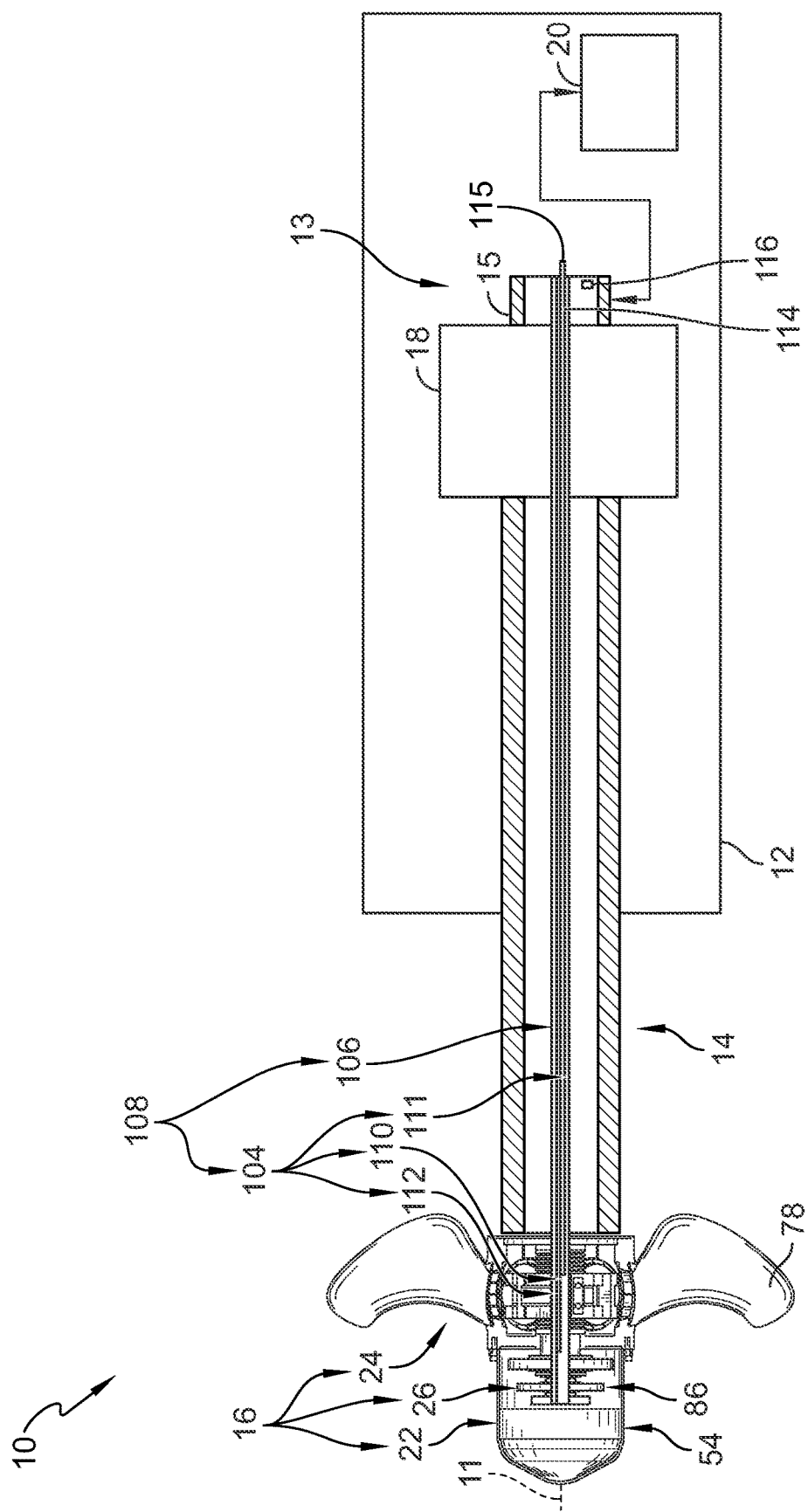
FIG. 1 is a diagrammatic view of a watercraft that includes a hull, a hollow propulsion shaft extending from the hull, and an electrically actuated propeller pitch control system coupled with the propulsion shaft for rotation therewith, the pitch control system having a propeller hub assembly coupled with the propulsion shaft, propeller blades extending outwardly from the propeller hub assembly that rotate about the central axis to move the watercraft, and an electrically actuated drive system to adjust a pitch angle of the propeller blades so that a speed and an acceleration of the watercraft can be changed.

For the purposes of promoting an understanding of the principles of the disclosure, reference will now be made to a number of illustrative embodiments illustrated in the drawings and specific language will be used to describe the same.

An illustrative watercraft 10 includes a hull 12 (illustrated diagrammatically), a propulsion shaft 14 extending outwardly away from the hull 12, and an electrically actuated propeller pitch control system 16 coupled with the propulsion shaft 14 as shown in FIG. 1. The hull 12 is a watertight body of the watercraft 10 and is at least partially submerged in water during operation of the watercraft 10. The propulsion shaft 14 couples the electrically actuated propeller pitch control system 16 with the hull 12. The propulsion shaft 14 and the electrically actuated propeller pitch control system 16 rotate about a central axis 11 with one another to propel the watercraft 10 through fluid.

The watercraft 10 further includes a control unit 13 that includes an interface box 15, a propulsion motor 18 coupled with the propulsion shaft 14, and a motor drive 20 as shown in FIG. 1. The motor drive 20 drives an actuator motor 54, which will be described in more detail below. The propulsion motor 18 drives rotation of the propulsion shaft 14, and thus, the electrically actuated propeller pitch control system 16 about the central axis 11 to move the watercraft 10 through fluid. The motor drive 20 includes a controller having a processor and a memory having instructions stored therein to be executed by the processor to control the motor drive 20 and propulsion motor 18. For example, the memory includes instructions to cause the processor to vary the speed of the propulsion motor 18 and vary a pitch angle of the propeller blades.

Figure 3:
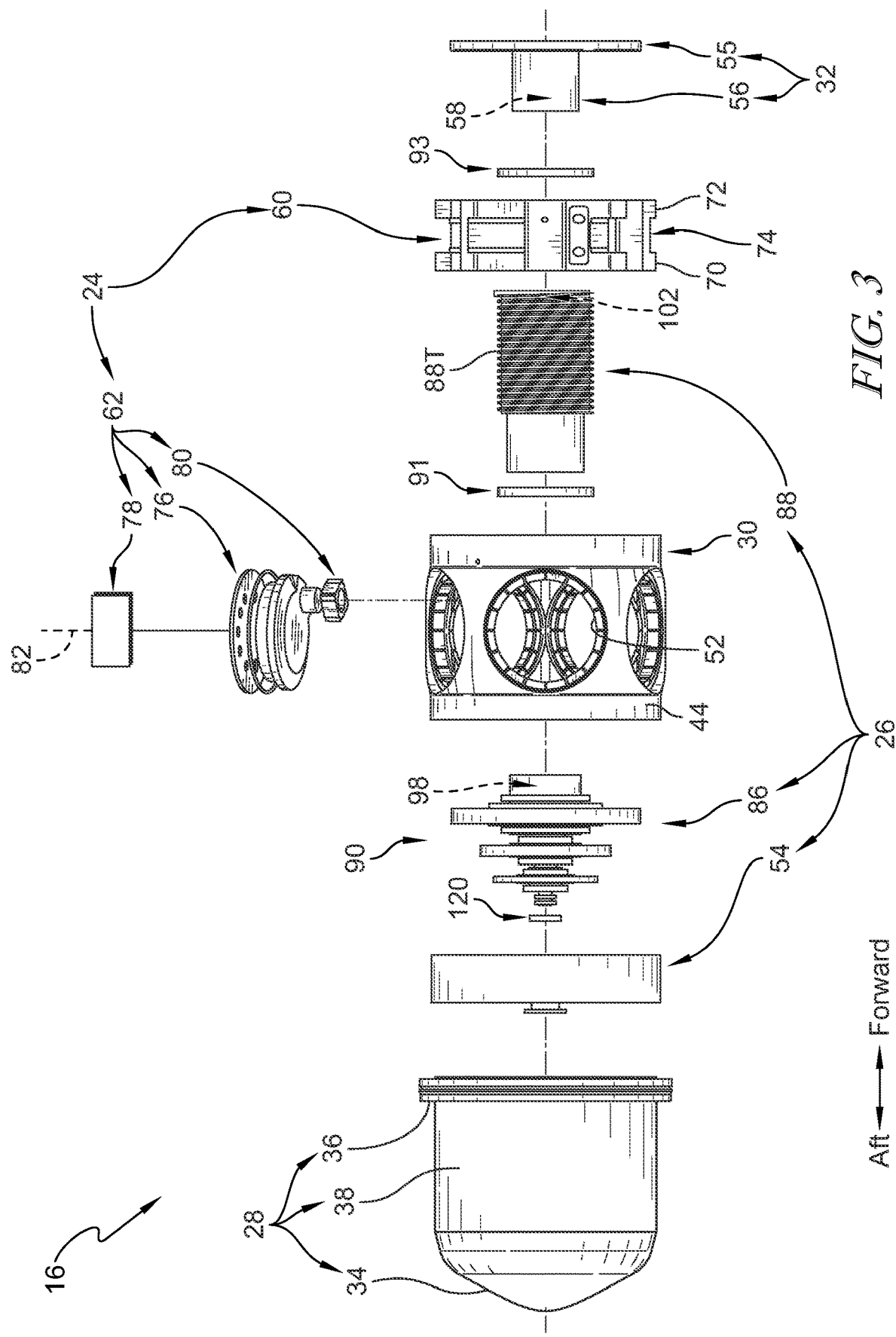
FIG. 3 is an exploded view of the pitch control system of FIG. 1, showing that, from left to right, the pitch control system includes the hub cone, an actuator motor, a rotary position encoder, a reduction gearset, the hub body, a first bearing, a lead screw, the crosshead, a second bearing, and a spigot, and further suggesting that the crank ring is received in one of the blade-receiving holes formed in the hub body and a diagrammatic propeller blade extends outwardly from the crank ring.

The electrically actuated propeller pitch control system 16 includes a propeller hub assembly 22, a propeller assembly 24, and a crosshead drive system 26 as shown in FIGS. 1 and 3. The propeller hub assembly 22 is coupled with the propulsion shaft 14 for rotation therewith. The propeller assembly 24 is configured to selectively rotate a plurality of propeller blades 78 to vary a pitch angle of the plurality of propeller blades 78 during operation of the watercraft 10. The crosshead drive system 26 drives movement of the propeller assembly 24 so that the plurality of propeller blades 78 can rotate to vary the pitch angle.

Controllable pitch propellers allow for different operating positions to be achieved through rotation of the propeller blades 78. For example, the pitch angle of the propeller blades 78 may be adjusted to change a speed or an acceleration of the watercraft 10. Additionally, the pitch angle of the propeller blades 78 may be adjusted to create reverse thrust for braking or backward movement of the watercraft 10.

In conventional systems, actuation and propeller blade rotation may be achieved through hydraulic systems. However, hydraulic systems may be relatively expensive and may take up a large amount of space on the watercraft. Additionally, hydraulic fluids used in hydraulic systems may present environmental risks due to leaking of the fluids into water.

In accordance with the present disclosure, the plurality of propeller blades 78 are driven through the actuator motor 54, which may also be referred to as an electric motor 54, and a transmission 86. The plurality of propeller blades 78 are controllable such that each propeller blade 78 may be rotated or pitched to achieve different operating positions. Electric motors, without a transmission, may produce relatively low torque torque at a relatively high speed. A transmission 86, such as a reduction gearset 86, coupled with the actuator motor 54 allows an output speed of the drive shaft to be reduced while the torque is increased. Reduction gearsets may reduce the output speed of the shaft and increase the torque with high efficiency, low noise impact, and in a compact size. Reduction gearsets, thus, allow for a size of the electric motor to be decreased compared to an electric motor sized to provide the desired torque without a gearset. Similarly, reduction gearsets allow for finer, discrete control over movement of the shaft.

Figure 4A:
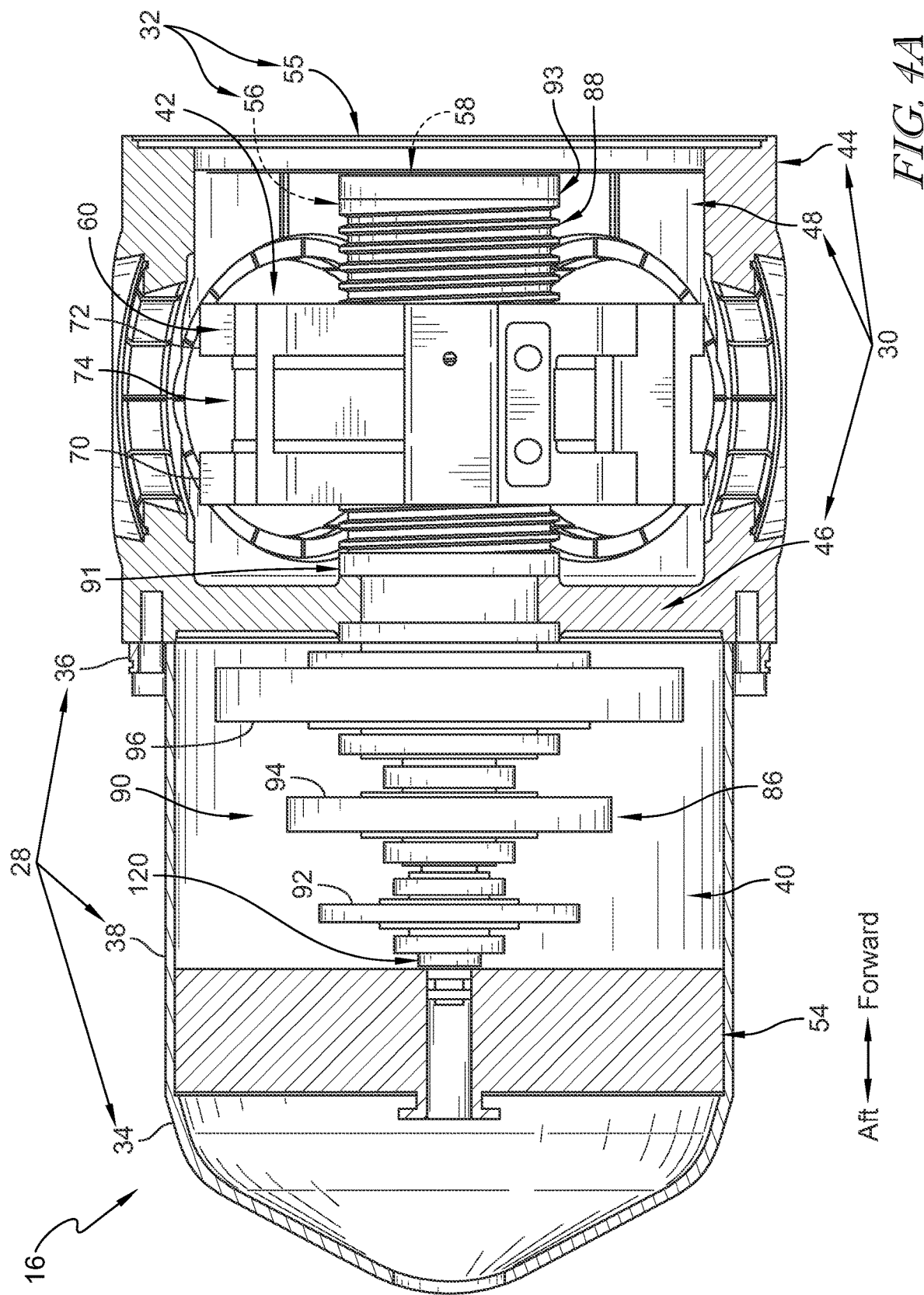
FIG. 4A is a cutaway perspective view of the pitch control system of FIG. 1, showing that the actuator motor is coupled with the reduction gearset and the reduction gearset is coupled with the lead screw that extends through a threaded hole formed in the crosshead, and further suggesting that the actuator motor drives rotation of the reduction gearset and the lead screw, which drives axial translation of the crosshead relative to the lead screw.

Referring to FIGS. 3 and 4A, the propeller hub assembly 22, also referred to as a propeller hub 22, includes a hub cone 28, a hub body 30, and a spigot 32. The hub cone 28 is hollow in the illustrative embodiment and coupled with the hub body 30. The hub body 30 is coupled with the spigot 32 and the propeller assembly 24. The propulsion shaft 14 is coupled directly to the hub body 30, and the propulsion shaft 14 drives rotation of the hub cone 28 and the hub body 30 about the central axis 11 to cause the propeller blades 78 to move the watercraft 10.

Figure 2:
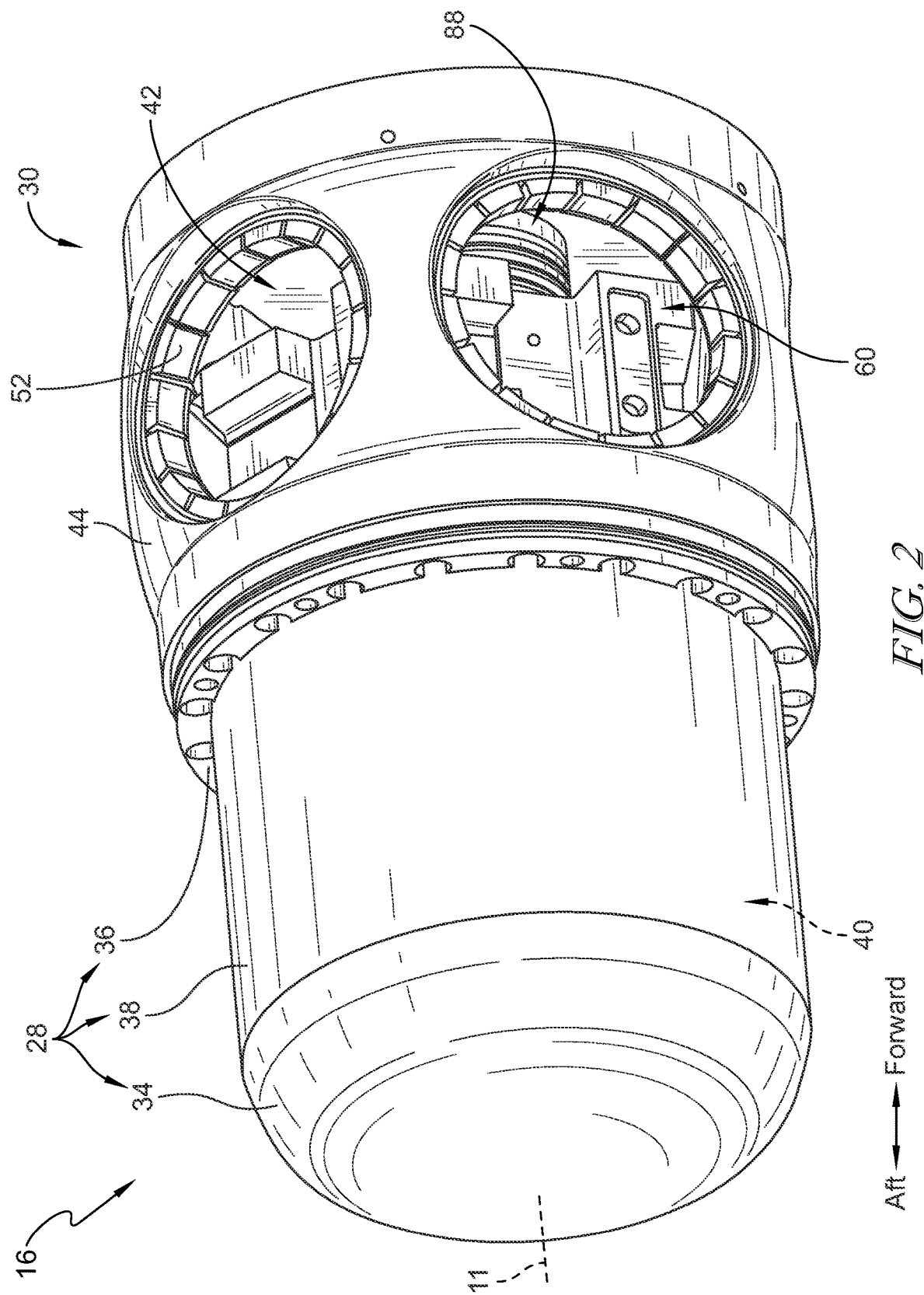
FIG. 2 is a perspective view of a portion of the pitch control system of FIG. 1, showing the propeller hub assembly includes a hub cone and a hub body coupled with a forward end of the hub cone, the hub body is formed to include blade-receiving holes circumferentially spaced apart from one another to receive a crank ring coupled with the propeller blades therein, and further showing a crosshead located inside of the hub body to engage the crank ring via a cam follower.

The hub cone 28 extends circumferentially about the central axis 11 as shown in FIG. 2. The hub cone 28 includes an aft end 34, a forward end 36 opposite the aft end 34, and an outer wall 38. The aft end 34 of the hub cone 28 extends radially inwardly toward the central axis 11 to define a cone shape. The forward end 36 extends radially outwardly away from the outer wall 38 and is coupled with the hub body 30. The outer wall 38 extends between the aft end 34 and the forward end 36 about the central axis 11 to define a cavity 40. A portion of the crosshead drive system 26 is located in the cavity 40. In the illustrative embodiment, a diameter of the hub cone 28 is less than a diameter of the hub body 30.

The hub body 30 is arranged circumferentially about the central axis 11 to define an interior space 42 therein as shown in FIG. 2. In the illustrative embodiment, the hub body 30 is coupled with the forward end 36 of the hub cone 28 through a plurality of fasteners circumferentially spaced apart from one another as shown in FIG. 4A. The hub body 30 includes an outer band 44 that extends circumferentially about the central axis 11, an aft wall 46, and a forward wall 48. The outer band 44 defines the interior space 42 of the hub body 30. The forward end 36 of the hub cone 28 is coupled with the outer band 44. The aft wall 46 extends radially inwardly from the outer band 44 toward the central axis 11 to define an opening into the interior space 42. The forward wall 48 extends radially inwardly from the outer band 44 toward the central axis 11 to define an opening into the interior space 42.

Figure 6:
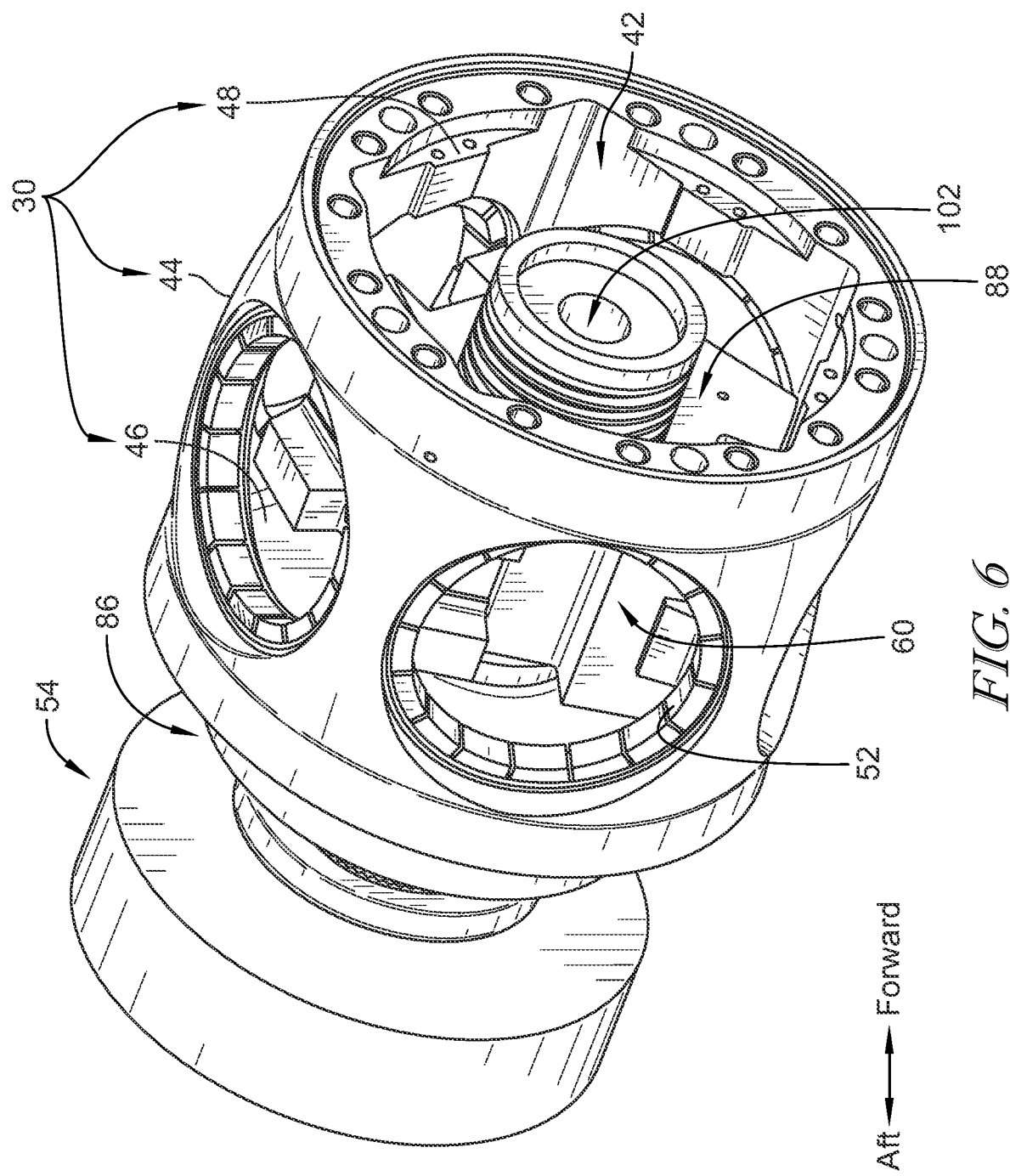
FIG. 6 is a perspective view of a portion of the pitch control system of FIG. 1 with the hub cone and the spigot removed, showing that the hub body includes an outer band that extends circumferentially about the central axis and a forward wall extends radially inwardly from the outer band, and the forward wall defines an opening into an interior space of the hub body that the spigot fits into to close the opening, and further showing that the crosshead and the lead screw are located in the interior space of the hub body.

The outer band 44 of the hub body 30 is formed to include a plurality of blade-receiving holes 52 extending through the outer band 44 as shown in FIGS. 2 and 6. The plurality of blade-receiving holes 52 are circumferentially spaced apart from one another, and each of the plurality of blade-receiving holes 52 opens into the interior space 42. The plurality of blade-receiving holes 52 are located axially between the aft wall 46 and the forward wall 48. It should be understood that there may be any number of blade-receiving holes 52 formed circumferentially around the outer band 44, such as, but not limited to, three holes, four holes, or five holes.

The spigot 32 is coupled with the hub body 30 and located axially between the hub body 30 and the propulsion shaft 14 as shown in FIG. 1. The spigot 32 includes a flange 55 that extends circumferentially about the central axis 11 and a cylindrical member 56 as shown in FIG. 3. The cylindrical member 56 extends axially aft away from the flange 55 and into the interior space 42 of the hub body 30. The spigot 32 is formed to include a first axial passage 58 extending therethrough along the central axis 11 as shown in FIGS. 1 and 4A. The flange 55 engages the forward wall 48 of the hub body 30 as shown in FIG. 4A. In the illustrative embodiment, a plurality of fasteners couple the flange 55 to the forward wall 48 of the hub body 30 as suggested in FIG. 6.

A diameter of the flange 55 is less than the diameter of the hub body 30 such that the outer band 44 of the hub body 30 extends circumferentially around the flange 55 as shown in FIG. 4A. The flange 55 is inserted partially into the interior space 42 of the hub body 30 to engage the forward wall 48 of the hub body 30. The flange 55 closes the opening into the interior space 42 of the hub body 30 formed in the forward wall 48 as shown in FIG. 4A.

Figure 5:
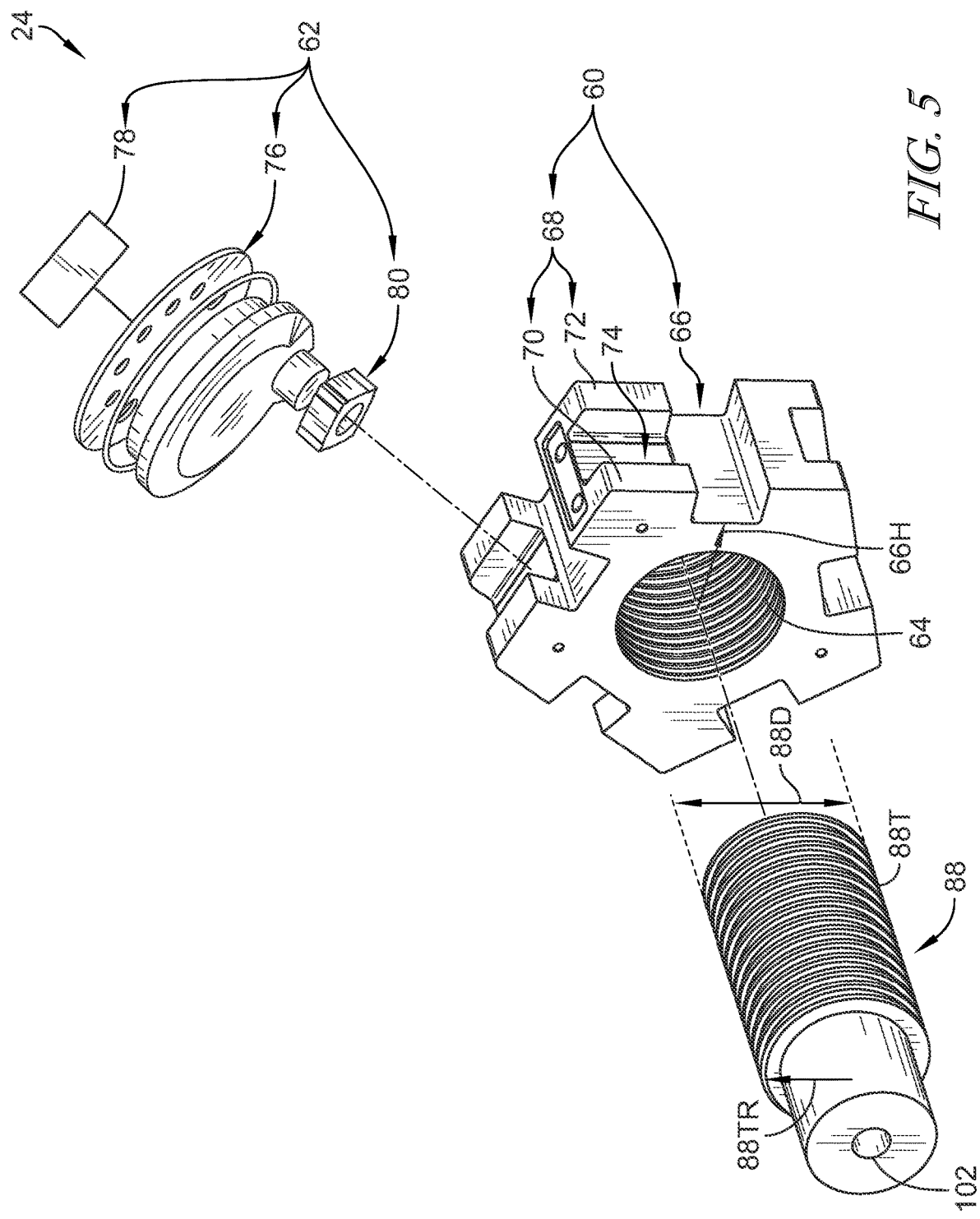
FIG. 5 is an exploded view of a portion of the pitch control system of FIG. 1, showing that the lead screw extends through and is mated with the threaded hole formed in the crosshead, and the crosshead includes a body and cams extending radially outwardly away from the body, and each cam defines a slot, and further showing that a cam follower coupled with the crank ring extends inwardly from the crank ring and slides within the slot of the cam to cause the propeller blades to change pitch in response to axial movement of the crosshead.

The propeller assembly 24 includes a crosshead 60 and a plurality of variable pitch blade assemblies 62 as shown in FIGS. 1, 3, and 5. The crosshead 60 is located in the interior space 42 of the hub body 30 axially aft of the spigot 32 as shown in FIG. 4A. The plurality of variable pitch blade assemblies 62 are located circumferentially about the central axis 11 as shown in FIG. 1.

The crosshead 60 is formed to include a threaded hole 64 extending axially therethrough as shown in FIGS. 4A and 5. In the illustrative embodiment, the crosshead 60 is formed as a monolithic, single piece component. The crosshead 60 includes a body 66 extending circumferentially about the central axis 11 and a plurality of cams 68 extending radially outwardly away from the body 66. The body 66 of the crosshead 60 has a radial height 66H as shown in FIG. 5. The plurality of cams 68 are circumferentially spaced apart from one another around the body 66. Each of the plurality of cams 68 includes a first guide arm 70 and a second guide arm 72 axially spaced apart from the first guide arm 70. A slot 74 is defined axially between the first guide arm 70 and the second guide arm 72 as shown in FIGS. 4A and 5. The slot 74 is radially spaced apart from the body 66 of the crosshead 60, and the slot 74 extends perpendicular to the central axis 11. It will be understood that there may be any number of cams 68 included in the crosshead 60, such as, but not limited to, three cams, four cams, or five cams. In the illustrative embodiment, the number of cams 68 is equal to the number of propeller blades 78.

The plurality of variable pitch blade assemblies 62 are spaced apart circumferentially around the central axis 11 as shown in FIG. 1. Each of the plurality of variable pitch blade assemblies 62 includes a crank ring 76, a propeller blade 78 fixed to and extending radially outwardly from the crank ring 76, and a cam follower 80 that engages the crosshead 60 as suggested in FIG. 5. The crank ring 76 is received by a corresponding one of the plurality of blade-receiving holes 52 as suggested in FIG. 3. The propeller blade 78 rotates about the central axis 11 with propeller hub assembly 22 and the propulsion shaft 14 to propel the watercraft 10.

Each of the plurality of variable pitch blade assemblies 62 extends through a corresponding one of the plurality of blade-receiving holes 52 formed in the outer band 44 of the hub body 30 as shown in FIGS. 1 and 3. The crank ring 76 rotates within the corresponding one of the plurality of blade-receiving holes 52. Each propeller blade 78 defines a blade axis 82 that extends through the propeller blade 78 and the crank ring 76 as shown in FIG. 3. The propeller blade 78 and the crank ring 76 rotate about the blade axis 82 to alter the pitch angle of the propeller blade 78. The cam follower 80 is received by a corresponding slot 74 such that the cam follower 80 is axially located between the first guide arm 70 and the second guide arm 72 as suggested in FIG. 5. In the illustrative embodiment, a number of the plurality of blade-receiving holes 52, a number of the plurality of cams 68, and a number of the plurality of variable pitch blade assemblies 62 are all equal to one another.

The crosshead drive system 26 includes the actuator motor 54, the transmission 86, and a lead screw 88 as shown in FIGS. 3 and 4A. The actuator motor 54 and the transmission 86 are located in the cavity 40 of the hub cone 28. The transmission 86 is coupled axially between the actuator motor 54 and the lead screw 88.

The actuator motor 54 is coupled with an aft end of the transmission 86, which may be an input shaft of the transmission 86, as shown in FIG. 4A. The aft end of the transmission 86 extends axially aft into and is supported by the actuator motor 54. A forward end of the transmission 86, which may be an output shaft of the transmission 86, is coupled with the lead screw 88. The transmission 86 and the lead screw 88 are driven by the actuator motor 54. The lead screw 88 rotates about the central axis 11 relative to the propeller hub assembly 22 to move selectively the crosshead 60 axially relative to the central axis 11. The crosshead 60 rotates with the propeller hub assembly 22 during operation of the propeller pitch control system 16, but does not rotate relative to the hub assembly 22 or propeller blades 78.

Figure 7:
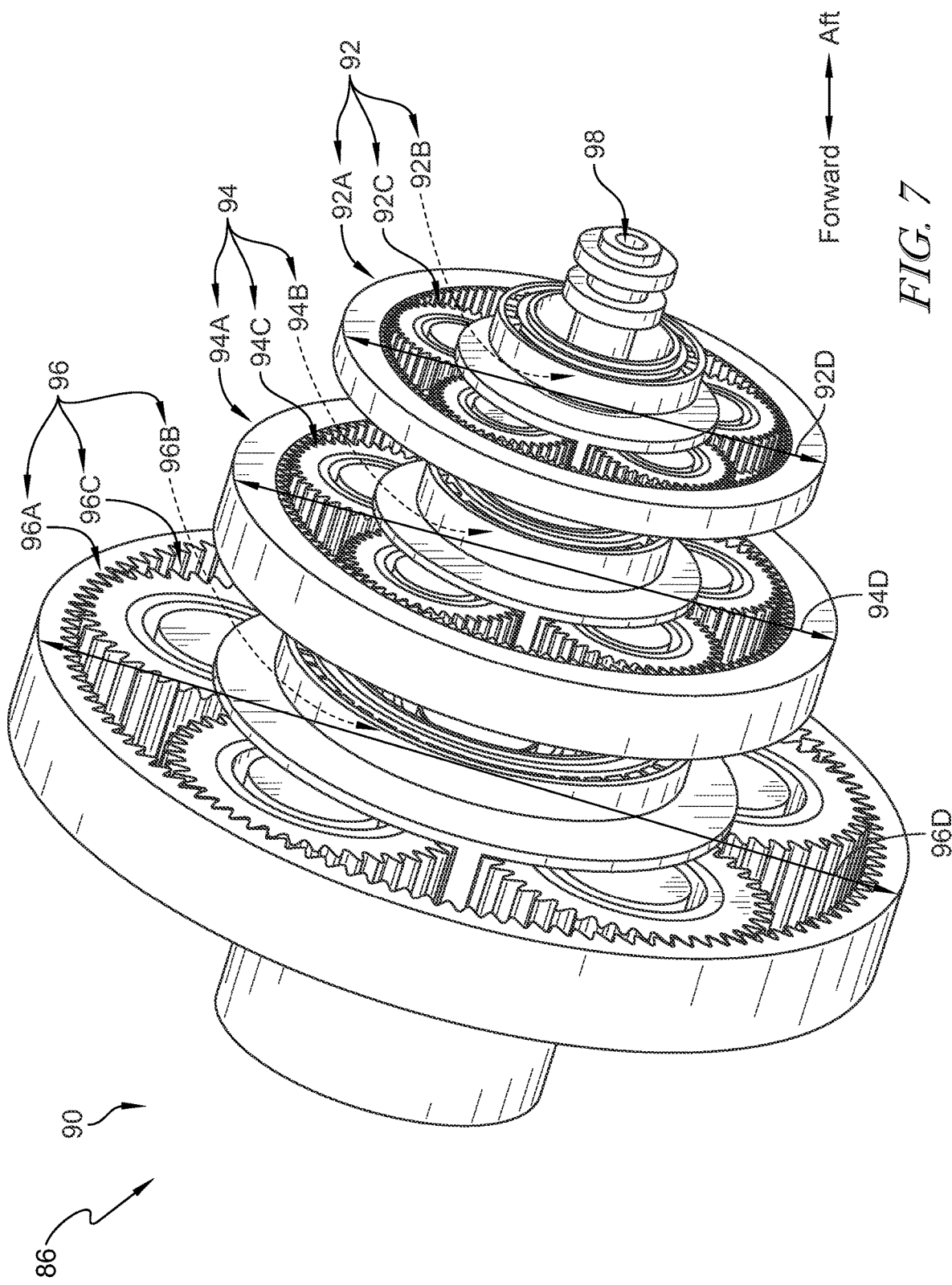
FIG. 7 is a perspective view of the reduction gearset of the pitch control system of FIG. 4A, showing that the reduction gearset includes a first planetary gearset, a second planetary gearset, and a third planetary gearset.

In the illustrative embodiment, the transmission 86 includes a reduction gearset 90 as shown in FIGS. 3, 4A, and 7. The reduction gearset 90 includes a first planetary gearset 92, a second planetary gearset 94, and a third planetary gearset 96. Though the reduction gearset 90 is shown and described as a three-stage reduction gearset 90, the reduction gearset 90 may have any number of stages (i.e., any number of planetary gearsets). The reduction gearset 90 produces a relatively high torque to rotate the lead screw 88. Planetary gearsets, such as the reduction gearset 90, may take on higher loads because the load is distributed among all of the planet gears within the planetary gearset. Generally, planetary gearsets allow for higher gear ratios in confined spaces, and planetary gearsets have relatively low weights compared to more traditional gearboxes. In other embodiments, the transmission includes transmission means other than planetary gearsets.

The first planetary gearset 92 includes a first ring gear 92A, a first sun gear 92B, and a plurality of first planet gears 92C as shown in FIG. 7. The first sun gear 92B is located in a center of the first planetary gearset 92. The first sun gear 92B is connected to the actuator motor 54. The plurality of first planet gears 92C are arranged circumferentially around the first sun gear 92B. The plurality of first planet gears 92C may include any number of planet gears, such as, but not limited to, six planet gears 92C. The first sun gear 92B rotates the plurality of first planet gears 92C. The first ring gear 92A is arranged radially outward of the plurality of first planet gears 92C, and the plurality of first planet gears 92C simultaneously rotate the first ring gear 92A. The plurality of first planet gears 92C may be constrained by a carrier to keep the plurality of first planet gears 92C from spinning around the first sun gear 92B. The first ring gear 92A has a first diameter 92D as shown in FIG. 7.

The second planetary gearset 94 includes a second ring gear 94A, a second sun gear 94B, and a plurality of second planet gears 94C as shown in FIG. 7. The second sun gear 94B is located in a center of the second planetary gearset 94 and coupled with the first ring gear 92A. The plurality of second planet gears 94C are arranged circumferentially around the second sun gear 94B. The plurality of second planet gears 94C may include any number of planet gears, such as, but not limited to, six planet gears 94C. The second sun gear 94B rotates the plurality of second planet gears 94C. The second ring gear 94A is arranged radially outward of the plurality of second planet gears 94C, and the plurality of second planet gears 94C simultaneously rotate the second ring gear 94A. The plurality of second planet gears 94C may be constrained by a carrier to keep the plurality of second planet gears 94C from spinning around the second sun gear 94B. The second ring gear 94A has a second diameter 94D that is greater than the first diameter 92D of the first ring gear 92A as shown in FIG. 7. A diameter of the second sun gear 94B is greater than a diameter of the first sun gear 92B. A diameter of each of the plurality of second planet gears 94C is greater than a diameter of each of the plurality of first planet gears 92C.

The third planetary gearset 96 includes a third ring gear 96A, a third sun gear 96B, and a plurality of third planet gears 96C as shown in FIG. 7. The third sun gear 96B is located in a center of the third planetary gearset 96 and coupled with the second ring gear 94A. The plurality of third planet gears 96C are arranged circumferentially around the third sun gear 96B. The plurality of third planet gears 96C may include any number of planet gears, such as, but not limited to, six planet gears 96C. The third sun gear 96B rotates the plurality of third planet gears 96C. The third ring gear 96A is arranged radially outward of the plurality of third planet gears 96C, and the plurality of third planet gears 96C simultaneously rotate the third ring gear 96A. The plurality of third planet gears 96C may be constrained by a carrier to keep the plurality of third planet gears 96C from spinning around the third sun gear 96B. The third ring gear 96A has a third diameter 96D that is greater than the first diameter 92D of the first ring gear 92A and the second diameter 94D of the second ring gear 94A as shown in FIG. 7. A diameter of the third sun gear 96B is greater than the diameter of the second sun gear 94B and the diameter of the first sun gear 92B. A diameter of each of the plurality of third planet gears 96C is greater than the diameter of each of the plurality of first planet gears 92C and the diameter of each of the plurality of second planet gears 94C. The third ring gear 96A is coupled with the lead screw 88.

The first planetary gearset 92 is arranged axially between the actuator motor 54 and the second planetary gearset 94 as shown in FIG. 4A. The second planetary gearset 94 is arranged axially between the first planetary gearset 92 and the third planetary gearset 96, and the third planetary gearset 96 is arranged axially between the second planetary gearset 94 and the crosshead 60. Though the reduction gearset 90 is shown and described as a planetary gearset, any other gearset capable of producing an adequate gear ratio is contemplated. The reduction gearset 90 is formed to include a second axial passage 98 extending axially therethrough along the central axis 11 as shown in FIGS. 1 and 7. The second axial passage 98 of the reduction gearset 90 is aligned with the first axial passage 58 of the spigot 32 as shown in FIGS. 1 and 3.

The lead screw 88 is coupled axially between the reduction gearset 90 and the spigot 32 as shown in FIG. 4A. At least a portion of the lead screw 88 is formed to include threads 88T. The portion of the lead screw 88 formed to include threads 88T extends axially through and is mated with the threaded hole 64 formed in the crosshead 60. The lead screw 88 is directly threaded to the crosshead 60. The reduction gearset 90 is coupled with an aft end of the lead screw 88 as suggested in FIG. 4A. The cylindrical member 56 of the spigot 32 is coupled with a forward end of the lead screw 88 as suggested in FIG. 4A. The lead screw 88 is formed to include a third axial passage 102 extending axially therethrough along the central axis 11 as shown in FIGS. 1 and 6.

The actuator motor 54 is configured to drive rotation of the reduction gearset 90 and the lead screw 88 about the central axis 11. The rotation of the lead screw 88 causes the crosshead 60 to move axially fore and aft within the interior space 42 of the hub body 30. The lead screw 88 translates rotational motion of the lead screw 88 into linear motion of the crosshead 60. The axial translation of the crosshead 60 drives rotation of each of the crank rings 76 and the propeller blades 78 about the corresponding blade axis 82 to vary the pitch angle of each of the propeller blades 78. The crosshead 60 moves axially along the central axis 11 relative to the propeller hub assembly 22. In the illustrative embodiment, the crosshead 60 does not rotate relative to the propeller hub assembly 22.

As the crosshead 60 axially translates along the lead screw 88, the cam follower 80 coupled with the crank ring 76 is forced to move with the crosshead 60 because the cam follower 80 is located axially between the first guide arm 70 and the second guide arm 72 of the crosshead 60 as suggested in FIG. 5. The axial translation of the cam follower 80 causes rotation of the crank ring 76 within the corresponding blade-receiving hole 52 formed in the hub body 30 about the corresponding blade axis 82. Because the propeller blade 78 is fixed to the crank ring 76, the propeller blade 78 rotates with the crank ring 76 about the blade axis 82. The rotation of the propeller blade 78 about the blade axis 82 adjusts the pitch angle of the propeller blade 78.

After rotation of the propeller blade 78 to the desired pitch angle, the actuator motor 54 stops driving rotation of the lead screw 88. In response to the lead screw 88 not rotating, the crosshead 60 stops axial translation along the lead screw 88. The propeller blade 78 is then fixed at the desired pitch angle as the cam follower 80 is blocked from further axial movement because the cam follower 80 is locked between the first guide arm 70 and the second guide arm 72 of the crosshead 60. The lead screw 88 blocks axial movement of the crosshead 60 when the actuator motor 54 is not rotating such that the lead screw 88 provides an automatic locking feature to lock the pitch angle of the propeller blades 78 when the actuator motor 54 is not active or becomes inoperable. Due to the large area of contact between the lead screw 88 and the crosshead 60, there is a large load carrying capacity, which results in high friction between the lead screw 88 and the crosshead 60. The automatic locking feature of the lead screw 88 is dependent on friction between the threads 88T of the lead screw 88 and the threaded hole 64 of the crosshead 60. The automatic locking feature allows the propeller blades 78 to remain in place in response to the actuator motor 54 not being powered.

The lead screw 88 may be an ACME lead screw, a power screw, or any other type of lead screw 88. The threads 88T of the lead screw 88 have a radius 88TR as shown in FIG. 5.

In some embodiments, a major diameter 88D of the threads 88T is between about 3 inches and about 16 inches. In some embodiments, the major diameter 88D of the threads 88T is between about 4 inches and about 15 inches. In some embodiments, the major diameter 88D of the threads 88T is between about 5 inches and about 14 inches. In some embodiments, a pitch of the threads 88T is between about 0.1 inches and about 7 inches. In some embodiments, the pitch of the threads 88T is between about 0.2 inches and about 6 inches. In some embodiments, the pitch of the threads 88T is between about 0.3 inches and about 5 inches. In some embodiments, a ratio of the major diameter 88D of the threads 88T and a diameter of the hub body 30 is about 1 to about 5. In some embodiments, a ratio of the major diameter 88D of the threads 88T and a diameter of the hub body 30 is about 1 to about 7.6. In some embodiments, a ratio of the major diameter 88D of the threads 88T and a diameter of the hub body 30 is about 1 to about 2.5. A relatively large major diameter 88D of the threads 88T of the lead screw 88 may allow for the pitch angle of the propeller blades 78 to be adjusted quickly, and thus, allows the watercraft 10 to come to an abrupt stop.

The crosshead drive system 26 further includes a first bearing 91 and a second bearing 93 as shown in FIGS. 3 and 4A. The first bearing 91 fits onto the portion of the lead screw 88 formed without threads 88T so that the first bearing 91 abuts the portion of the lead screw 88 formed to include threads 88T. The second bearing 93 fits onto the cylindrical member 56 of the spigot 32 to abut the portion of the lead screw 88 formed to include threads 88T opposite the first bearing 91 as shown in FIG. 4A. The bearings 91, 93 rotate along with the lead screw 88 and the spigot 32. The bearings 91, 93 are configured to support a high axial load. The bearings 91, 93 may be any type of bearing. In some embodiments, the bearings 91, 93 may be thrust bearings, such as, but not limited to, thrust ball bearings, cylindrical thrust roller bearings, tapered roller thrust bearings, or spherical roller thrust bearings.

The first axial passage 58 of the spigot 32, the third axial passage 102 of the lead screw 88, and the second axial passage 98 of the reduction gearset 90 are all aligned with one another to define a continuous passageway 104 that extends axially through the pitch control system 16 as shown in FIG. 1. The propulsion shaft 14 is hollow as suggested in FIG. 1. The propulsion shaft 14, the propulsion motor 18, and the interface box 15 of the watercraft 10 are formed to include a fourth axial passage 106 extending axially therethrough that is aligned with the continuous passageway 104 of the pitch control system 16 to define an extended passageway 108 as shown in FIG. 1. In some embodiments, the extended passageway 108 may be filled with lubricant.

Figure 4B:
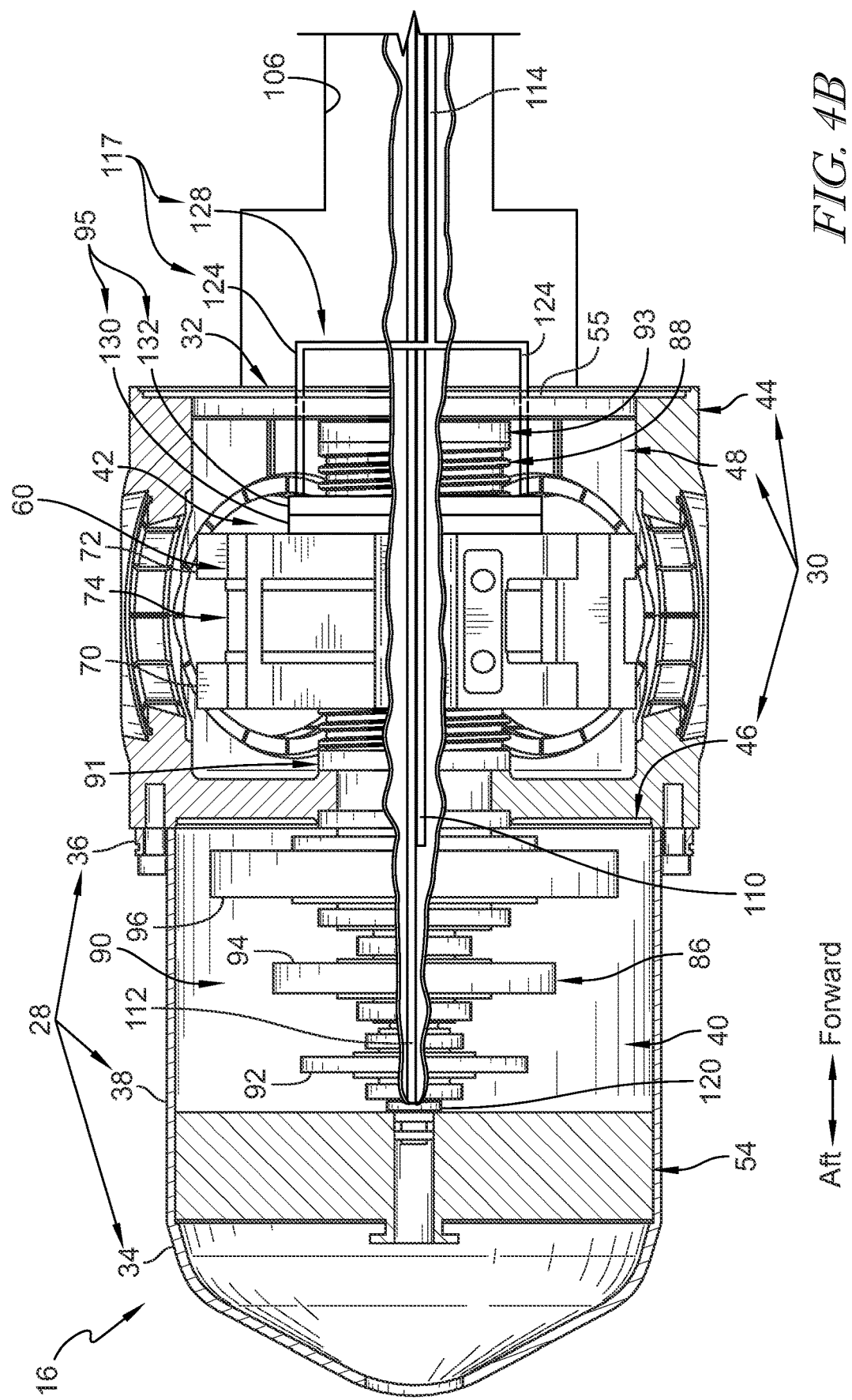
FIG. 4B is a breakaway view of the pitch control system of FIG. 4A, showing that a lubrication conduit extends through the hollow propulsion shaft toward the gear set to lubricate the gear set, an electrical conduit extends through the hollow propulsion shaft toward the actuator motor to supply power to the actuator motor, and further showing a pitch position indicator system coupled with the crosshead to axially translate with the crosshead to indicate the pitch angle of the propeller blades to crew members in the hull.

The crosshead drive system 26 includes a lubrication conduit 110 and an electrical conduit 112 as shown in FIGS. 1 and 4B. The lubrication conduit 110 extends axially through the extended passageway 108 between the interface box 15 and the transmission 86. The electrical conduit 112 extends axially through the extended passageway 108 between the interface box 15 and the actuator motor 54. The lubrication conduit 110 and the electrical conduit 112 rotate with the propulsion shaft 14. Extending the lubrication conduit 110 and the electrical conduit 112 through the propulsion motor 18 and into the interface box 15 allows for terminal end connections of both conduits 110, 112 to be located in the hull 12 in the interface box 15.

The lubrication conduit 110 directs lubrication, such as oil, toward the lead screw 88, the bearings 91, 93, and the transmission 86 as shown in FIGS. 1 and 4B. The lubrication conduit 110 pressurizes passive lubrication within the hub body 30 and the transmission 86. In some embodiments, the lubrication conduit 110 is formed to include outlet holes to direct the lubrication out of the lubrication conduit 110 and to the lead screw 88, the bearings 91, 93 and the transmission 86. In some embodiments, the lubrication conduit 110 is formed to include inlet holes to direct excess lubrication from the lead screw 88, the bearings 91, 93 and the transmission 86 into the lubrication conduit 110 so that the excess lubrication can be directed back toward the interface box 15. In some embodiments, the lubrication conduit 110 includes an outlet conduit to direct lubrication from the interface box 15 and toward the pitch control system 16 and an inlet conduit to direct lubrication from the pitch control system 16 to the interface box 15. The lubrication conduit 110 may provide heat transfer for the pitch control system 16. In some embodiments, the extended passageway 108 may be filled with lubricant such that the lubrication conduit 110 is omitted. The lubricant directed into the hub urges the remaining lubricant already in the hub through the passageway 108 to circulate the lubricant through the system.

The electrical conduit 112 is connected with the actuator motor 54 to supply power to the actuator motor 54 as shown in FIGS. 1 and 4B. The electrical conduit 112 may include cables for supplying power to the actuator motor 54, controls, and sensors. For example, the signal from a rotary position encoder 120 may be transmitted through the electrical conduit 112.

In conventional hydraulic actuated systems, the hydraulic piston rod extended from the hull to the crosshead and provided visual indication of the crosshead (and thus the propeller pitch angle) to crew members in the hull. The electrically actuated system of the present disclosure does not include such a hydraulic rod. Even still, some ship owners and operators will desire a visual or physical indication of the pitch angle of the propeller blades in the hull 12.

In the illustrative embodiment, the crosshead drive system 26 includes a pitch position indicator system 111 configured to indicate the pitch angle of the plurality of propeller blades 78 to crew members in the hull 12 as shown in FIGS. 1 and 4B. The pitch position indicator system 111 includes a position rod 114 and a crosshead follower 117 coupled with the crosshead 60. The position rod 114 and the crosshead follower 117 rotate about the central axis 11 with the propulsion shaft 14. The position rod 114 extends through the fourth axial passage 106 formed in the propulsion shaft 14. The position rod 114 extends axially into the interface box 15 as shown in FIG. 1.

The crosshead follower 117 is coupled with an aft end of the position rod 114 and extends axially away from the position rod 114 and toward the crosshead 60 as shown in FIG. 4B. The crosshead follower 117 includes a base 128 and a plurality of pins 124. The base 128 is coupled with the aft end of the position rod 114 and extends radially away from the position rod 114. In some embodiments, the base 128 is annular and extends circumferentially about the central axis 11. In some embodiments, the base 128 extends partially about the central axis 11. The base 128 is located in the fourth axial passage 106 formed in the propulsion shaft 14 such that the base 128 is free for axial movement in the fourth axial passage 106 as suggested in FIG. 4B.

As shown in FIG. 4B, a diameter of the fourth axial passage 106 formed in the propulsion shaft 14 may vary along an axial length of the propulsion shaft 14. For example, the diameter of the fourth axial passage 106 directly forward of the spigot 32 may be greater than the diameter of the fourth axial passage 106 directly aft of the hull 12, the propulsion motor 18, or any other portion of the fourth axial passage 106. The varying diameter may provide adequate space for the base 128 to move axially within the fourth axial passage 106.

The base 128 is formed to define at least one through hole extending axially therethrough as suggested in FIG. 4B. The lubrication conduit 110 and the electrical conduit 112 extend through the fourth axial passage 106 of the propulsion shaft 14, through the at least one through hole formed in the base 128, and into the continuous passageway 104 of the pitch control system 16. In some embodiments, the lubrication conduit 110 and the electrical conduit 112 extend through the same through hole formed in the base 128. In some embodiments, the lubrication conduit 110 and the electrical conduit 112 extend through different through holes formed in the base 128.

Each of the plurality of pins 124 extends axially aft away from the base 128 and toward the crosshead 60 as shown in FIG. 4B. The plurality of pins 124 are spaced apart circumferentially about the central axis 11 and the lead screw 88. In some embodiments, the crosshead follower 117 may include three pins 124 circumferentially spaced apart from one another about the central axis 11. In some embodiments, the crosshead follower 117 may include four pins 124, though any number of pins 124 is contemplated.

The flange 55 of the spigot 32 is formed to include sealed holes extending axially therethrough. Each of the plurality of pins 124 extends axially through the sealed holes formed in the flange 55 of the spigot 32 and into the interior space 42 of the hub body 30. The sealed holes allow for sealed penetration through the flange 55 of the spigot 32, while also allowing the plurality of pins 124 to axially translate within the sealed holes in response to axial translation of the crosshead 60. A number of sealed holes formed in the flange 55 is equal to a number of the plurality of pins 124.

In some embodiments, each of the plurality of pins 124 is coupled with a forward-facing surface of the crosshead 60 for axial movement therewith as the crosshead 60 axially translates relative to the propeller hub assembly 22. The crosshead follower 117 moves the position rod 114 axially relative to the central axis 11 in response to the crosshead 60 moving axially along the central axis 11.

In some embodiments, the crosshead drive system 26 includes a third bearing 95 as shown in FIG. 4B. The third bearing 95 fits onto the threaded portion of the lead screw 88 and is located axially forward of the crosshead 60. The third bearing 95 is coupled with the forward-facing surface of crosshead 60. In some embodiments, the third bearing 95 is a turntable bearing or a slewing bearing, such as a lazy susan bearing. The third bearing 95 includes a first plate 130 and a second plate 132 with rollers therebetween. The first plate 130 is fixed to the crosshead 60 so that the third bearing 95 axially translates with the crosshead 60, and the second plate 132 is free for rotation. The plurality of pins 124 are coupled with the second plate 132 of the third bearing 95 as shown in FIG. 4B. The third bearing 95 allows for any circumferential offset of the crosshead 60 relative to the crosshead follower 117. Any such offset or twist during use is expected to be minimal, the third bearing 95 may be used to avoid any binding caused by any such circumferential offset. The lubrication conduit 110 may provide lubrication for the third bearing 95. In some embodiments, the third bearing 95 is omitted such that the plurality of pins 124 are coupled directly with the crosshead 60.

The pitch position indicator system 111 provides a marker 115 as shown in FIG. 1. In some embodiments, the marker 115 is provided on the position rod 114. In some embodiments, the marker 115 is provided on the crosshead follower 117. In some embodiments, an axial location of the marker 115 relative to the central axis 11 indicates the pitch angle of the plurality of propeller blades 78. In some embodiments, an axial location of the marker 115 relative to the central axis 11 indicates an axial position of the crosshead 60 relative to the lead screw 88.

In some embodiments, the marker 115 is a terminal end of the position rod 114, which may be located in or near the interface box 15 as shown in FIG. 1. In such an embodiment, in response to the crosshead 60 moving axially aft, the position rod 114 moves axially aft with the crosshead 60, which causes the terminal end of the position rod 114 to move axially aft. In response to the crosshead 60 moving axially forward, the position rod 114 moves axially forward with the crosshead 60, which causes the terminal end of the position rod 114 to move axially forward. The axial location of the terminal end of the position rod 114 is indicative of the pitch angle of the propeller blades 78. The axial location of the terminal end of the position rod 114 in the interface box 15 may provide a visual indication of the pitch angle of the propeller blades 78. For example, a legend may be located adjacent the position rod 114 with a plurality of pitch angle markings and the marker 15 is calibrated to align with the pitch marking of the current pitch angle of the propeller blades 78.

The marker 115 may be provided on any portion of the position rod 114. In some embodiments, the marker 115 is formed on a portion of the position rod 114 between the crosshead follower 117 and the terminal end of the position rod 114. For example, the marker 115 may be provided on a portion of the position rod 114 located within the fourth axial passage 106. In some embodiments, the marker 115 may be provided on the base 128 of the crosshead follower 117 such that the axial location of the base 128 within the fourth axial passage 106 is indicative of the pitch angle of the propeller blades 78. In some embodiments, the marker 115 may be provided on at least one of the plurality of pins 124 of the crosshead follower 117 such that the axial location of the at least one of the plurality of pins 124 is indicative of the pitch angle of the propeller blades 78.

In some embodiments, the marker 115 includes visual indicia, such as, but not limited to, a cut, a notch, tape, ink, or a protrusion. For example, the visual indicia may be a symbol, a line, or a color.

In some embodiments, the pitch position indicator system 111 includes a sensor 116 as shown in FIG. 1. The sensor 116 detects the axial location of the marker 115 to determine the pitch angle of the propeller blades 78 and/or the axial position of the crosshead 60 relative to the lead screw 88. The sensor 116 may be a motion sensor, an optical sensor, a proximity sensor, a contact sensor, a position sensor, a photoelectric sensor, among other sensors.

In some embodiments, the sensor 116 may be located in the interface box 15 as shown in FIG. 1. For example, the sensor 116 may detect the axial location of the marker 115 in the interface box 15. In some embodiments, the sensor 116 may be located elsewhere, such as in the propulsion shaft 14. For example, the sensor 116 may detect the axial location of the marker 115 in the fourth axial passage 106. The sensor 116 provides real-time pitch angle information. The electrical conduit 112 may include connections for the sensor 116.

In some embodiments, the crosshead drive system 26 includes a rotary position encoder 120 located within the hub cone 28 axially between the actuator motor 54 and the transmission 86 as shown in FIGS. 3 and 4A. The rotary position encoder 120 detects rotation of the input shaft coupling the actuator motor 54 with the transmission 86. The detection of the rotation may be used to determine the pitch angle of the plurality of propeller blades 78. The signal from the rotary position encoder 120 may be transmitted through the electrical conduit 112. The rotary position encoder 120 provides real-time pitch angle information. In some embodiments, the rotary position encoder 120 may be located elsewhere within the propeller hub assembly 22.

In some embodiments, the rotary position encoder 120 may be omitted. In some embodiments, the pitch position indicator system 111 may be omitted. In some embodiments, the crosshead drive system 26 includes the pitch position indicator system 111 and the rotary position encoder 120. In some embodiments, the sensor 116 of the pitch position indicator system 111 may be omitted.

A method for adjusting the pitch angle of the propeller blade is provided. The method includes supplying power to the actuator motor 54 arranged within the hub cone 28 of the propeller hub assembly 22. The method includes driving the reduction gearset 90 arranged within the hub cone 28 with the actuator motor 54. The method includes rotating the lead screw 88 coupled with the reduction gearset 90 about the central axis 11 with the reduction gearset 90.

The method includes axially translating the crosshead 60 arranged within the hub body 30 of the propeller hub assembly 22 in response to rotation of the lead screw 88. The lead screw 88 extends axially through the crosshead 60. The method includes rotating the propeller blade 78 about the blade axis 82 extending through the propeller blade 78 in response to axial translation of the crosshead 60 to adjust the pitch angle of the propeller blade 78.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electrically actuated propeller pitch control system for use with watercraft, the propeller pitch control system comprising:
    a propeller hub assembly that includes a hub cone extending circumferentially about a central axis having a forward end, an aft end opposite the forward end, and an outer wall extending between the forward end and the aft end about the central axis to define a cavity, a hub body coupled with the forward end of the hub cone and arranged circumferentially about the central axis to define an interior space therein, and a spigot coupled to the hub body, the hub body configured to transfer rotational energy from a propulsion shaft to the propeller hub assembly to cause the propeller hub assembly to rotate about the central axis during operation of the watercraft, the hub body formed to include a plurality of blade-receiving holes extending therethrough circumferentially spaced apart from one another and opening into the interior space, a propeller assembly configured to selectively rotate a propeller blade to vary a pitch angle of the propeller blade during operation of the watercraft, the propeller assembly includes a crosshead located in the interior space of the hub body axially aft of the spigot and a variable pitch blade assembly coupled with the hub body, the variable pitch blade assembly extends through a respective one of the plurality of blade-receiving holes of the hub body and into engagement with the crosshead, the crosshead is formed to include a threaded hole extending axially therethrough, and the crosshead is arranged to move selectively axially along the central axis to cause the propeller blade to rotate, and a crosshead drive system that includes an electric motor located in the cavity of the hub cone, a transmission including a reduction gearset coupled with the electric motor and located in the cavity of the hub cone, and a lead screw that extends through and is mated with the threaded hole formed in the crosshead, the lead screw being coupled with the reduction gearset, and the electric motor is configured to drive rotation of the reduction gearset and the lead screw about the central axis to cause the crosshead to move axially within the interior space of the hub body and drive rotation of the propeller blade about a blade axis extending through the propeller blade to vary the pitch angle of the propeller blade, wherein the reduction gearset includes a first planetary gearset and a second planetary gearset, the first planetary gearset includes a first ring gear having a first diameter, a first sun gear, and a plurality of first planet gears, the second planetary gearset includes a second ring gear having a second diameter, a second sun gear, and a plurality of second planet gears, and wherein the second diameter of the second ring gear is greater than the first diameter of the first ring gear, wherein the spigot is formed to include a first axial passage extending therethrough along the central axis, the reduction gearset is formed to include a second axial passage extending therethrough along the central axis, and the lead screw is formed to include a third axial passage extending therethrough along the central axis, wherein the first axial passage of the spigot, the second axial passage of the reduction gearset, and the third axial passage of the lead screw are aligned with one another to define a continuous passageway that extends axially through the propeller pitch control system, wherein the crosshead drive system includes a lubrication conduit extending through the continuous passageway to direct lubrication therethrough toward the reduction gearset and the lead screw and an electrical conduit extending through the continuous passageway and connected with the electric motor to supply power to the electric motor.

2. The propeller pitch control system of claim 1, wherein the reduction gearset includes a third planetary gearset including a third ring gear having a third diameter, a third sun gear, and a plurality of third planet gears, and the third diameter of the third ring gear is greater than the second diameter of the second ring gear.

3. The propeller pitch control system of claim 2, wherein the first planetary gearset is arranged axially between the electric motor and the second planetary gearset, the second planetary gearset is arranged axially between the first planetary gearset and the third planetary gearset, and the third planetary gearset is arranged axially between the second planetary gearset and the crosshead.

4. The propeller pitch control system of claim 1, wherein the first planetary gearset is coupled directly with the electric motor and the second planetary gearset is coupled directly with the lead screw.

5. The propeller pitch control system of claim 1, wherein the crosshead drive system includes a pitch position indicator system configured to detect the pitch angle of the propeller blade, the pitch position indicator system including a crosshead follower that extends through the propeller hub assembly and is coupled for axial movement with the crosshead and a position rod coupled with the crosshead follower and extending away from the propeller hub assembly and through the propulsion shaft, the position rod being arranged to move axially along the central axis within the propulsion shaft in response to the crosshead moving axially along the central axis.

6. The propeller pitch control system of claim 1, wherein the spigot includes a flange that extends circumferentially about the central axis and a cylindrical member that extends axially aft away from the flange and into the interior space of the hub body, the hub body includes an outer band that extends circumferentially about the central axis and a forward wall that extends radially inwardly from the outer band toward the central axis, the forward wall defines an opening into the interior space of the hub body, and the flange engages the forward wall such that the outer band of the hub body extends circumferentially around the flange and the flange closes the opening into the interior space of the hub body.

7. The propeller pitch control system of claim 1, wherein the hub body includes an outer band that extends circumferentially about the central axis and an aft wall that extends radially inwardly from the outer band toward the central axis, and wherein the reduction gearset includes a forward end and an aft end opposite the forward end, the aft end of the reduction gearset extends into and is supported by the electric motor, and the forward end of the reduction gearset extends into the lead screw.

8. The propeller pitch control system of claim 1, wherein the variable pitch blade assembly includes a crank ring configured to be received by a corresponding one of the plurality of blade-receiving holes to rotate within the corresponding one of the plurality of blade-receiving holes about the blade axis, the propeller blade fixed to and extending radially outwardly from the crank ring, and a cam follower that engages the crosshead, and wherein the crosshead includes a body extending circumferentially about the central axis and a plurality of cams extending radially outwardly away from the body and circumferentially spaced apart from one another, each of the plurality of cams defines a slot that extends perpendicular to the central axis, and the cam follower of the variable pitch blade assembly is received in a corresponding slot of one of the plurality of cams.

9. An electrically actuated propeller pitch control system for use with watercraft, the propeller pitch control system comprising:

a propeller hub assembly that includes a hub cone extending circumferentially about a central axis having a forward end and an aft end opposite the forward end, a hub body coupled with the forward end of the hub cone and arranged circumferentially about the central axis to define an interior space therein, and a spigot coupled to the hub body, the hub body configured to transfer rotational energy to the propeller hub assembly to cause the propeller hub assembly to rotate about the central axis during operation of the watercraft, a propeller assembly configured to selectively rotate a propeller blade, the propeller assembly includes a crosshead located within the hub body and a variable pitch blade assembly that engages the crosshead, the crosshead is formed to include a hole extending axially therethrough, and a crosshead drive system that includes an electric motor located within the hub cone, a transmission coupled with the electric motor, and a lead screw that extends through the hole formed in the crosshead, the lead screw being coupled with the transmission, and the electric motor is configured to drive rotation of the transmission and the lead screw about the central axis to cause the crosshead to move selectively axially along the central axis and drive rotation of the propeller blade to vary a pitch angle of the propeller blade, wherein the spigot includes a flange that extends circumferentially about the central axis and a cylindrical member that extends axially aft away from the flange and into the interior space of the hub body, the hub body includes an outer band that extends circumferentially about the central axis and a forward wall that extends radially inwardly from the outer band toward the central axis, the forward wall defines an opening into the interior space of the hub body, and the flange engages the forward wall such that the outer band of the hub body extends circumferentially around the flange and the flange closes the opening into the interior space of the hub body.

10. The propeller pitch control system of claim 9, wherein the transmission includes a first planetary gearset coupled with the electric motor and a second planetary gearset coupled between the first planetary gearset and the crosshead, the first planetary gearset includes a first ring gear having a first diameter, a first sun gear, and a plurality of first planet gears, the second planetary gearset includes a second ring gear having a second diameter, a second sun gear, and a plurality of second planet gears, and wherein the second diameter of the second ring gear is greater than the first diameter of the first ring gear.

11. The propeller pitch control system of claim 10, wherein the transmission includes a third planetary gearset including a third ring gear having a third diameter, a third sun gear, and a plurality of third planet gears, and the third diameter of the third ring gear is greater than the second diameter of the second ring gear.

12. The propeller pitch control system of claim 11, wherein the first planetary gearset is arranged axially between the electric motor and the second planetary gearset, the second planetary gearset is arranged axially between the first planetary gearset and the third planetary gearset, and the third planetary gearset is arranged axially between the second planetary gearset and the crosshead.

13. The propeller pitch control system of claim 9, wherein the spigot is formed to include a first axial passage extending therethrough along the central axis, the transmission is formed to include a second axial passage extending therethrough along the central axis, and the lead screw is formed to include a third axial passage extending therethrough along the central axis, wherein the first axial passage of the spigot, the second axial passage of the transmission, and the third axial passage of the lead screw are aligned with one another to define a continuous passageway that extends axially through the propeller pitch control system.

14. The propeller pitch control system of claim 13, wherein the crosshead drive system includes a lubrication conduit extending through the continuous passageway to direct lubrication therethrough toward the transmission and the lead screw and an electrical conduit extending through the continuous passageway and connected with the electric motor to supply power to the electric motor.

15. An electrically actuated propeller pitch control system for use with watercraft, the propeller pitch control system comprising:

a propeller hub assembly that includes a hub cone extending circumferentially about a central axis having a forward end and an aft end opposite the forward end, a hub body coupled with the forward end of the hub cone and arranged circumferentially about the central axis to define an interior space therein, and a spigot coupled to the hub body, the hub body configured to transfer rotational energy to the propeller hub assembly to cause the propeller hub assembly to rotate about the central axis during operation of the watercraft, a propeller assembly configured to selectively rotate a propeller blade, the propeller assembly includes a crosshead located within the hub body and a variable pitch blade assembly that engages the crosshead, the crosshead is formed to include a hole extending axially therethrough, and a crosshead drive system that includes an electric motor located within the hub cone, a transmission coupled with the electric motor, and a lead screw that extends through the hole formed in the crosshead, the lead screw being coupled with the transmission, and the electric motor is configured to drive rotation of the transmission and the lead screw about the central axis to cause the crosshead to move selectively axially along the central axis and drive rotation of the propeller blade to vary a pitch angle of the propeller blade, wherein the spigot is formed to include a first axial passage extending therethrough along the central axis, the transmission is formed to include a second axial passage extending therethrough along the central axis, and the lead screw is formed to include a third axial passage extending therethrough along the central axis, wherein the first axial passage of the spigot, the second axial passage of the transmission, and the third axial passage of the lead screw are aligned with one another to define a continuous passageway that extends axially through the propeller pitch control system, wherein the crosshead drive system includes a lubrication conduit extending through the continuous passageway to direct lubrication therethrough toward the transmission and the lead screw and an electrical conduit extending through the continuous passageway and connected with the electric motor to supply power to the electric motor.

16. The propeller pitch control system of claim 15, wherein the transmission includes a first planetary gearset coupled with the electric motor and a second planetary gearset coupled between the first planetary gearset and the crosshead, the first planetary gearset includes a first ring gear having a first diameter, a first sun gear, and a plurality of first planet gears, the second planetary gearset includes a second ring gear having a second diameter, a second sun gear, and a plurality of second planet gears, and wherein the second diameter of the second ring gear is greater than the first diameter of the first ring gear.

17. The propeller pitch control system of claim 16, wherein the transmission includes a third planetary gearset including a third ring gear having a third diameter, a third sun gear, and a plurality of third planet gears, and the third diameter of the third ring gear is greater than the second diameter of the second ring gear.

18. The propeller pitch control system of claim 17, wherein the first planetary gearset is arranged axially between the electric motor and the second planetary gearset, the second planetary gearset is arranged axially between the first planetary gearset and the third planetary gearset, and the third planetary gearset is arranged axially between the second planetary gearset and the crosshead.

19. The propeller pitch control system of claim 15, wherein the spigot includes a flange that extends circumferentially about the central axis and a cylindrical member that extends axially aft away from the flange and into the interior space of the hub body, the hub body includes an outer band that extends circumferentially about the central axis and a forward wall that extends radially inwardly from the outer band toward the central axis, the forward wall defines an opening into the interior space of the hub body, and the flange engages the forward wall such that the outer band of the hub body extends circumferentially around the flange and the flange closes the opening into the interior space of the hub body.

20. The propeller pitch control system of claim 15, wherein the crosshead drive system includes a pitch position indicator system configured to detect the pitch angle of the propeller blade, the pitch position indicator system including a crosshead follower that extends through the propeller hub assembly and is coupled for axial movement with the crosshead and a position rod coupled with the crosshead follower and extending away from the propeller hub assembly, the position rod being arranged to move axially along the central axis in response to the crosshead moving axially along the central axis.

* * * * *